UNITED STATES PATENT OFFICE.

WILLIAM I. BAKER, OF DECATUR, ILLINOIS, ASSIGNOR TO ERLE B. BELDEN, OF DECATUR, ILLINOIS.

PAINT-VEHICLE AND PROCESS OF MAKING SAME.

1,278,290. Specification of Letters Patent. Patented Sept. 10, 1918.

No Drawing. Application filed June 25, 1917. Serial No. 176,774.

*To all whom it may concern:*

Be it known that I, WILLIAM I. BAKER, a citizen of the United States, a resident of Decatur, in the county of Macon and State of Illinois, have invented new and useful Improvements in Paint-Vehicles and Processes of Making Same, of which the following is a specification.

This invention relates to a paint vehicle and process of making the same, and particularly an oil to be used as a paint oil or vehicle, especially as a substitute for linseed oil.

The principal object of this invention is the provision of such a composition which forms an effective ingredient in mixing paints, making the paint spread easier, minimizing the effect of heat and not peeling readily, and also reducing the cost of production.

My composition consists of a mixture of petroleum, drier, and fusel oil mixed preferably in the following proportions; 96 parts of petroleum; 3 parts of drier, composed of 2 parts of natural asphaltum, and 1 part of gum anime; and 1 part of fusel oil.

These ingredients are placed in a tank or receptacle which is within a larger tank so that it may be surrounded with water. A sufficient quantity of water is heated to the boiling point and poured into the larger tank, so as to surround the smaller tank, and subject the contents thereof to a gradual heating, a suitable cover being placed over the large tank. In the gradual heating the wax in the petroleum is fused or dissolved, and the ingredients are heated to form the oil. A greater amount of heat would result in the formation of gas, and the possibility of explosion.

This process produces a composition which forms an admirable and effective vehicle for paint pigments forming an easy spreading paint which is not readily affected by heat, and does not peel off or deteriorate easily. The expense of the ingredients and the production is reduced to a minimum.

I have specified one method of heating the mixture but it is to be expressly understood that various other methods may be utilized, such as running hot water or steam through coils of pipes located in the receptacle in which the mixture is placed.

What I claim is:

1. A composition of matter including petroleum, natural asphaltum and gum anime, and fusel oil.

2. A composition of matter including 96 parts of petroleum, 2 parts of natural asphaltum and 1 part of gum anime, and 1 part of fusel oil.

3. The process of making a vehicle for paints and the like consisting in subjecting a mixture of petroleum, drier and fusel oil to the heat of a body of water at approximately the boiling point.

4. The process of making a vehicle for paints and the like consisting in mixing a large proportion of petroleum with a small proportion of drier, and a smaller proportion of fusel oil, and subjecting the mixture to the heat of a body of water at approximately the boiling point.

5. The process of making a vehicle for paints and the like consisting in mixing a large proportion of petroleum with a small proportion of drier, and a smaller proportion of fusel oil, and subjecting the mixture to the heat of a body of water at approximately the boiling point, said mixture being placed in a closed receptacle positioned within a larger receptacle containing the heated water.

6. The process of making a vehicle for paints and the like including mixing 96 parts of petroleum, 2 parts natural asphaltum and 1 part gum anime, and 1 part of fusel oil, placing the mixture within a receptacle surrounded by a body of water initially heated to the boiling point, the gradual heat of the mixture causing the proper evaporation and fusing of the ingredients.

7. The process of making a vehicle for paints and the like, consisting in subjecting a mixture of petroleum, drier and fusel oil to heat at approximately the temperature of boiling water.

8. A paint vehicle including a comparatively large quantity of petroleum and a comparatively small quantity of drier composed of natural asphaltum and gum anime.

WILLIAM I. BAKER.